United States Patent
Hosoda et al.

(10) Patent No.: US 11,057,728 B2
(45) Date of Patent: Jul. 6, 2021

(54) INFORMATION PROCESSING APPARATUS, INFORMATION PROCESSING METHOD, AND PROGRAM

(71) Applicant: Sony Corporation, Tokyo (JP)

(72) Inventors: Yasuhide Hosoda, Kanagawa (JP); Yusuke Sakai, Kanagawa (JP); Shingo Utsuki, Kanagawa (JP)

(73) Assignee: Sony Corporation

( * ) Notice: Subject to any disclaimer, the term of this patent is extended or adjusted under 35 U.S.C. 154(b) by 15 days.

(21) Appl. No.: 16/491,391

(22) PCT Filed: Feb. 21, 2018

(86) PCT No.: PCT/JP2018/006099
§ 371 (c)(1),
(2) Date: Sep. 5, 2019

(87) PCT Pub. No.: WO2018/180024
PCT Pub. Date: Oct. 4, 2018

(65) Prior Publication Data
US 2020/0037094 A1 Jan. 30, 2020

(30) Foreign Application Priority Data
Mar. 27, 2017 (JP) .............................. JP2017-060692

(51) Int. Cl.
*H04S 7/00* (2006.01)
*G06F 3/16* (2006.01)
(Continued)

(52) U.S. Cl.
CPC .............. *H04S 7/303* (2013.01); *G06F 3/165* (2013.01); *G06F 3/167* (2013.01);
(Continued)

(58) Field of Classification Search
CPC .......... H04S 7/303; G06F 3/165; G06F 3/167; G10L 21/0232; H04R 1/02; H04R 2430/01; H04R 2400/13
See application file for complete search history.

(56) References Cited

U.S. PATENT DOCUMENTS 10,555,106 B1* 2/2020 Mehra .................... G06F 1/163
10,712,998 B2* 7/2020 Yasuda .................. H04M 11/06
(Continued)

FOREIGN PATENT DOCUMENTS

JP 2006236165 A 9/2006
JP 2010239508 A 10/2010
(Continued)

OTHER PUBLICATIONS

International Search Report corresponding to PCT/JP2018/006099, dated May 22, 2018, 3 pgs.

*Primary Examiner* — David L Ton
(74) *Attorney, Agent, or Firm* — Lerner, David, Littenberg, Krumholz & Mentlik, LLP

(57) ABSTRACT

Provided is an information processing apparatus, an information processing method, and a program capable of voice presentation, to a user, of information transmitted from another user around the user.
The information processing apparatus includes a control unit that performs control to present, to a user by voice, information that has been transmitted from another user in surroundings of the user. The control unit performs control to emphasize and present, by voice, specific information among the information which has been transmitted from another user in surroundings of the user, in accordance with a situation of the user.

20 Claims, 9 Drawing Sheets

(51) Int. Cl.
*G10L 21/0232* (2013.01)
*H04R 1/02* (2006.01)

(52) U.S. Cl.
CPC ............ *G10L 21/0232* (2013.01); *H04R 1/02* (2013.01); *H04R 2430/01* (2013.01); *H04S 2400/13* (2013.01)

(56) References Cited

U.S. PATENT DOCUMENTS

| | | |
|---|---|---|
| 2010/0246807 A1 | 9/2010 | Kemmochi et al. |
| 2012/0314871 A1 | 12/2012 | Koga |
| 2014/0172426 A1 | 6/2014 | Aratsu et al. |
| 2015/0088500 A1* | 3/2015 | Conliffe .................. H04R 1/10 704/235 |
| 2015/0249898 A1* | 9/2015 | Horbach ................ H04S 1/005 381/309 |
| 2016/0034251 A1 | 2/2016 | Sendai et al. |
| 2016/0080874 A1* | 3/2016 | Fullam .................. G06F 3/167 381/313 |

FOREIGN PATENT DOCUMENTS

| | | |
|---|---|---|
| JP | 2013005021 A | 1/2013 |
| JP | 2016033764 A | 3/2016 |
| WO | 2014097748 A1 | 6/2014 |

* cited by examiner

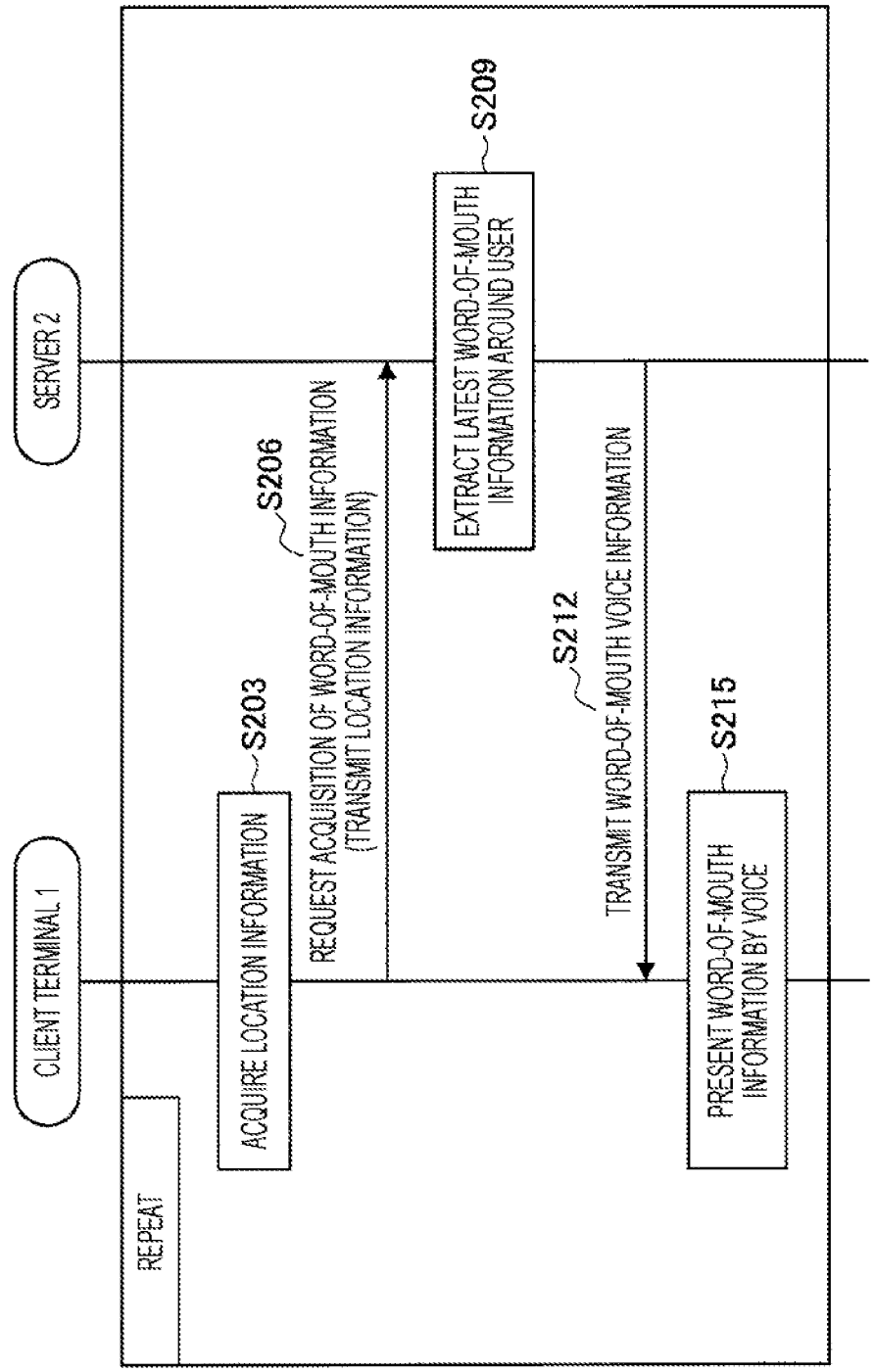

INFORMATION PROCESSING APPARATUS, INFORMATION PROCESSING METHOD, AND PROGRAM

CROSS-REFERENCE TO RELATED APPLICATIONS

This application is a national phase entry under 35 U.S.C. § 371 of International Application No. PCT/JP2018/006099 filed Feb. 21, 2018, which claims the priority from Japanese Patent Application No. 2017-060692 filed in the Japanese Patent Office on Mar. 27, 2017, the entire contents of which are hereby incorporated by reference.

TECHNICAL FIELD

The present disclosure relates to an information processing apparatus, an information processing method, and a program.

BACKGROUND ART

With the recent development of communication technology, it has become possible for each user to use various Internet services by using mobile terminals such as mobile phone terminals and smartphones. As an example of the Internet services, for example, there is a word-of-mouth information site on which evaluation (so-called, word-of-mouth information) posted by general users and regarding various contents such as movies, products, and restaurants can be browsed.

For such a word-of-mouth information presentation service, for example, Patent Document 1 below discloses a word-of-mouth information sharing device that quantitatively evaluates reliability of word-of-mouth information while concealing a transmission source of the word-of-mouth information.

CITATION LIST

Patent Document

Patent Document 1: Japanese Patent Application Laid-Open No. 2006-236165

SUMMARY OF THE INVENTION

Problems to be Solved by the Invention

However, the conventional method of presenting word-of-mouth information is performed on a text basis, and a user has to enter text of a search keyword and the like to operate, in order to search for word-of-mouth information desired to be known. Therefore, it has been difficult to acquire word-of-mouth information intuitively and easily.

Therefore, the present disclosure proposes an information processing apparatus, an information processing method, and a program capable of presenting, to a user by voice, information transmitted from another user around the user.

Solutions to Problems

According to the present disclosure, there is proposed an information processing apparatus including a control unit that performs control to present, to a user by voice, information that has been transmitted from another user in surroundings of the user. The control unit performs control such that, among the information which has been transmitted from another user in surroundings of the user, specific information is emphasized and presented by voice in accordance with a situation of the user.

According to the present disclosure, there is proposed an information processing method including performing control, by a processor, to present, to a user by voice, information that has been transmitted from another user in surroundings of the user. Furthermore, control is performed such that, among the information which has been transmitted from another user in surroundings of the user, specific information is emphasized and presented by voice in accordance with a situation of the user.

According to the present disclosure, there is disclosed a program that causes a computer to function as a control unit that performs control to present, to a user by voice, information that has been transmitted from another user in surroundings of the user. The control unit performs control such that, among the information which has been transmitted from another user in surroundings of the user, specific information is emphasized and presented by voice in accordance with a situation of the user.

Effects of the Invention

As described above, according to the present disclosure, it becomes possible to present, to a user by voice, information transmitted from another user around the user.

Note that the effect above is not necessarily limited, and in addition to the effect above or instead of the effect above, any of the effects described in this specification, or other effects that may be understood from the present specification may be exhibited.

BRIEF DESCRIPTION OF DRAWINGS

FIG. 9 is a sequence diagram showing presentation processing of word-of-mouth information according to the present embodiment.

MODE FOR CARRYING OUT THE INVENTION

Figure 1:
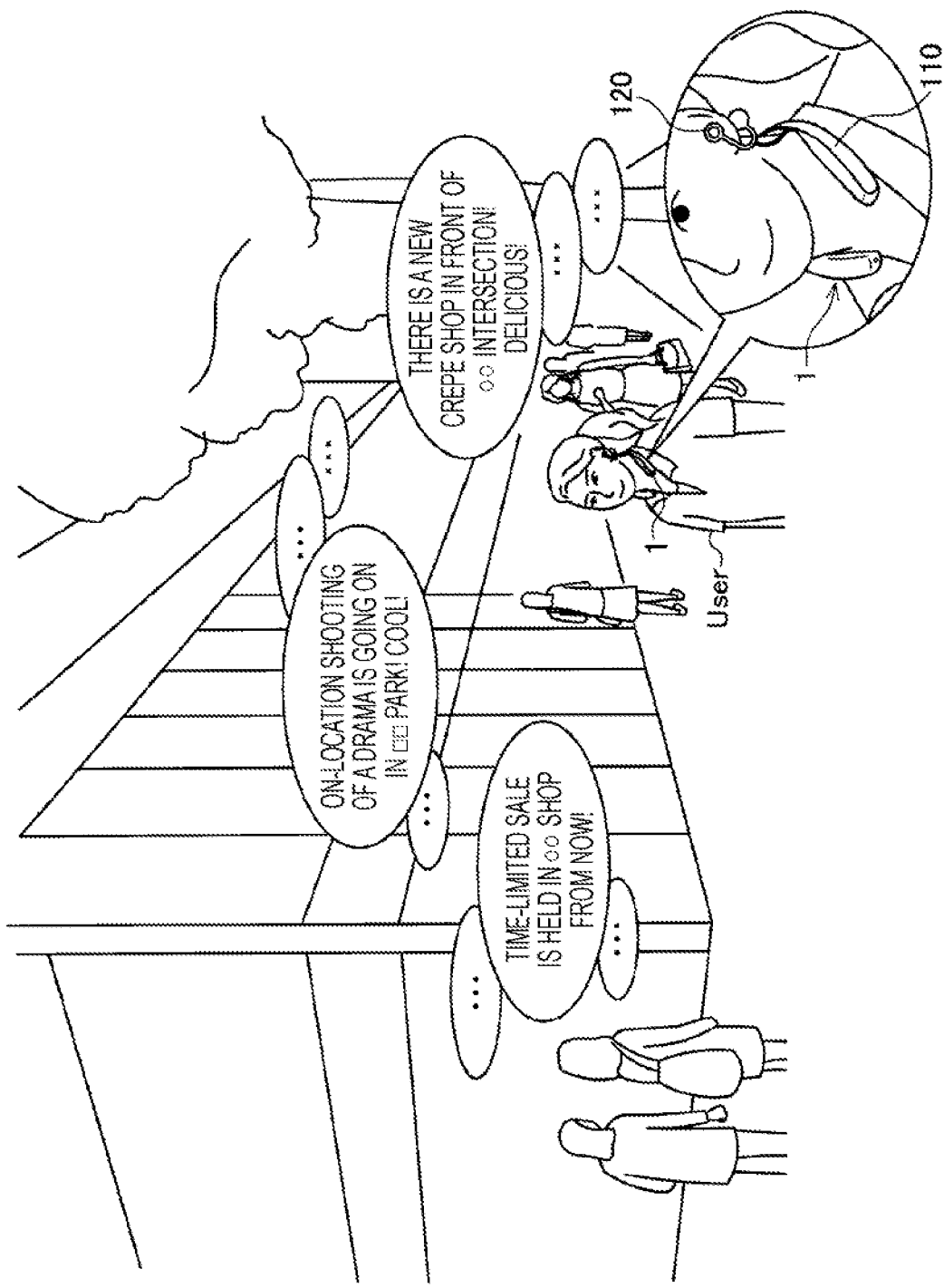
FIG. 1 is a view for explaining an overview of an information processing system according to an embodiment of the present disclosure.

Hereinafter, a preferred embodiment of the present disclosure will be described in detail with reference to the accompanying drawings. Note that, in this specification and the drawings, components having substantially the same functional configuration are denoted by the same reference numerals, and redundant explanations are omitted.

Furthermore, the description will be made in the following order.

1. Overview of information processing system according to embodiment of present disclosure
2. Configuration
2-1. Configuration of client terminal 1
2-2. Configuration of server 2
3. Operation processing
3-1. Word-of-mouth information registration processing
3-2. Word-of-mouth information presentation processing
4. Conclusion

1. OVERVIEW OF INFORMATION PROCESSING SYSTEM ACCORDING TO EMBODIMENT OF PRESENT DISCLOSURE

FIG. 1 is a view for explaining an overview of an information processing system according to an embodiment of the present disclosure. As shown in FIG. 1, the information processing system according to the present embodiment enables voice presentation of word-of-mouth information transmitted from another user in the vicinity, by a client terminal 1 worn by a user.

The client terminal 1 may be a wearable device such as, for example, a speaker to be worn around a neck as shown in FIG. 1 (neck band speaker). A main body part 110 of the neck band speaker is provided with a speaker, and it is possible to present word-of-mouth information to a user by voice. Meanwhile, the speaker provided to the neck band speaker can give an audio effect that sound can be heard at the ear, by using, for example, a virtual phones technology (VPT). When word-of-mouth information is presented by voice from the neck band speaker, word-of-mouth information can be heard along with surrounding sound, and the user can feel as if someone is actually muttering the word-of-mouth information in the vicinity.

Furthermore, in a case where an earphone 120 is connected to the main body part 110 of the neck band speaker, it is also possible to present word-of-mouth information by voice from the earphone 120. The earphone 120 that is used in the present embodiment may be an open-ear earphone. In the open-ear earphone, a portion to be put in the ear is formed in a ring shape (a state where the ear hole is open), and a sound is outputted from a ring-shaped inner surface. With this configuration, the user can hear the sound (word-of-mouth information) from the earphone together with surrounding environmental sound, without blockage of the surrounding environmental sound. Furthermore, although the earphone is connected to the neck band speaker by wire in the example shown in FIG. 1, the present embodiment is not limited to this, and a wireless earphone connected by wireless may be used. Furthermore, the client terminal 1 may be realized by the earphone alone. Furthermore, an earphone of an open-ear type (type without blocking the ear) is not limited to the ring-shaped earphone as shown in FIG. 1, and may be an ear-cuff-shaped earphone that is worn by being hooked to the ear or sandwiching the earlobe or an edge of the ear. Alternatively, a bone conduction earphone may be used. The bone conduction earphone may be an ear cuff type or clip type, or may be worn around the ear (around a base of the ear or around below the temple). Furthermore, even in a case of an earphone that is not an open-ear type, for example, in a case of an earphone having a noise canceling function (earphone with a microphone), as described above, the word-of-mouth information can be presented along with the surrounding sound, and the user can feel as if someone is actually muttering the word-of-mouth information in the vicinity, by synthesizing and reproducing surrounding sound that has been appropriately collected, with voice of the word-of-mouth information.

BACKGROUND

Here, the conventional method of presenting word-of-mouth information is performed on a text basis, and a user needs to enter text of a search keyword and the like to operate, in order to search for word-of-mouth information desired to be known. Therefore, reception of word-of-mouth information has not been intuitive and easy.

Furthermore, a touch operation with a smartphone or the like and a screen UI are not suitable for use during action.

Therefore, in the information processing system according to the present embodiment, when a user is walking in a town, for example, with the client terminal 1 worn as described above, word-of-mouth information transmitted from another user around the user can be presented by voice. Furthermore, in the information processing system according to the present embodiment, in accordance with user's motion (for example, turning around, standing, and the like), it is possible to emphasize (specifically, for example, by raising sound volume) and to present, by voice, specific word-of-mouth information presumed to interest the user.

With this configuration, just by walking in the town, the user can hear word-of-mouth information of the surrounding area from the vicinity, and furthermore, the user can easily acquire word-of-mouth information without losing sight and without effort for operation. Furthermore, the target word-of-mouth information is automatically emphasized and presented by action of the user such as turning around to a direction in which the word-of-mouth information interesting is heard, or standing and listening to the word-of-mouth information interesting, Therefore, the user can intuitively obtain information by natural action with a sense as if word-of-mouth information is actually heard from the surroundings.

Furthermore, in the information processing system according to the present embodiment, it is also possible to register word-of-mouth information by voice. A registrant can register word-of-mouth information with a sense of muttering what the registrant feels now.

Note that, in this specification, "word-of-mouth information" widely includes information transmitted by people, such as rumors, mutterings, feelings, thoughts, information regarding events, and useful information, in addition to evaluation of products, restaurants, and the like.

Figure 2:
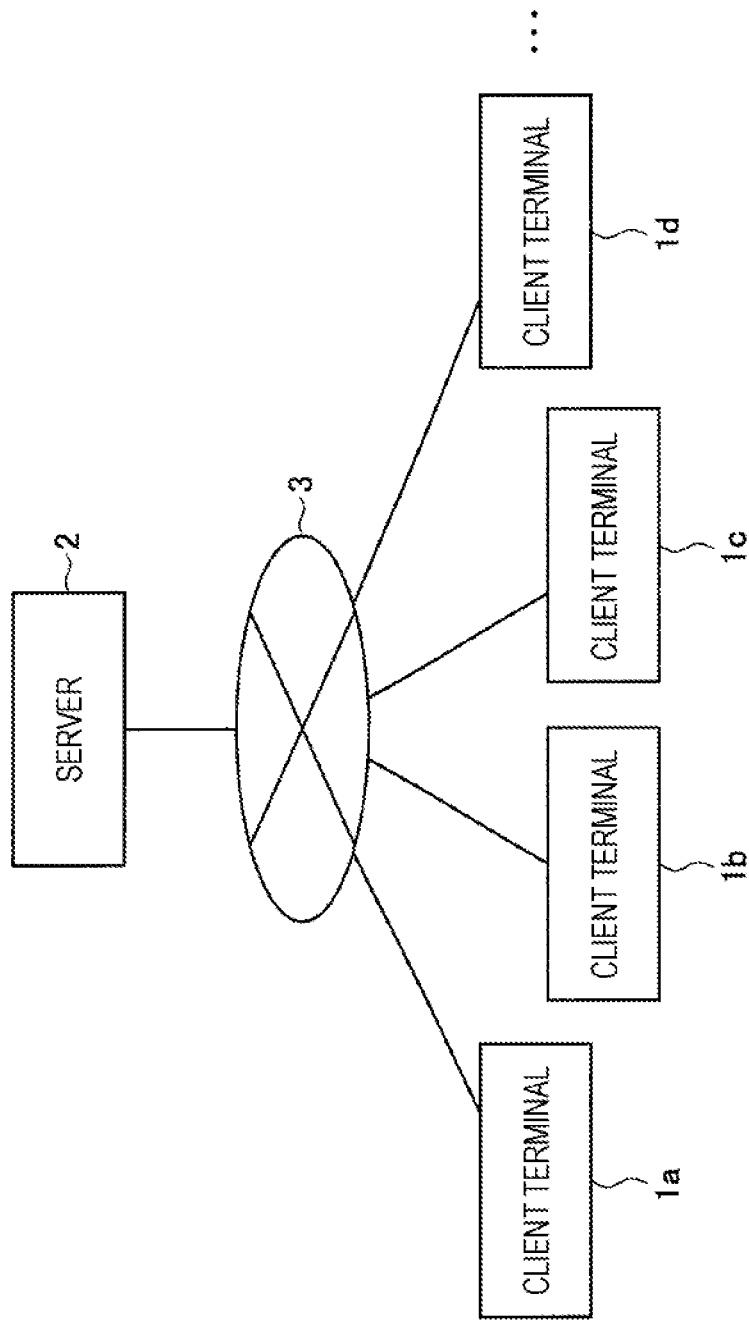
FIG. 2 is a diagram showing an example of an entire configuration of the information processing system according to the present embodiment.

Subsequently, an entire configuration of such an information processing system according to the present embodiment will be described with reference to FIG. 2. FIG. 2 is a diagram showing an example of an entire configuration of the information processing system according to the present embodiment.

As shown in FIG. 2, the information processing system according to the present embodiment includes the client terminal 1 (1*a* to 1*d* . . . ) to be worn by each user, and a server 2. The client terminal 1 and the server 2 are communicably connected via a network 3, to transmit and receive data.

The client terminal 1 can present word-of-mouth information to a user by voice as described above. Furthermore, the client terminal 1 transmits location information to the server 2 and requests distribution of word-of-mouth information. Furthermore, the client terminal 1 may transmit word-of-mouth information desired to be registered, to the server 2, together with location information.

The server 2 registers word-of-mouth information transmitted from the client terminal 1 of each user together with location information. Furthermore, in response to a request from the client terminal 1, the server 2 can distribute word-of-mouth information transmitted from the vicinity of the user's current location.

The information processing system according to an embodiment of the present disclosure has been described above. Subsequently, specific configurations of individual devices included in the information processing system according to the present embodiment will be described with reference to the drawings.

2. CONFIGURATION

<2-1. Configuration of Client Terminal 1>

Figure 3:
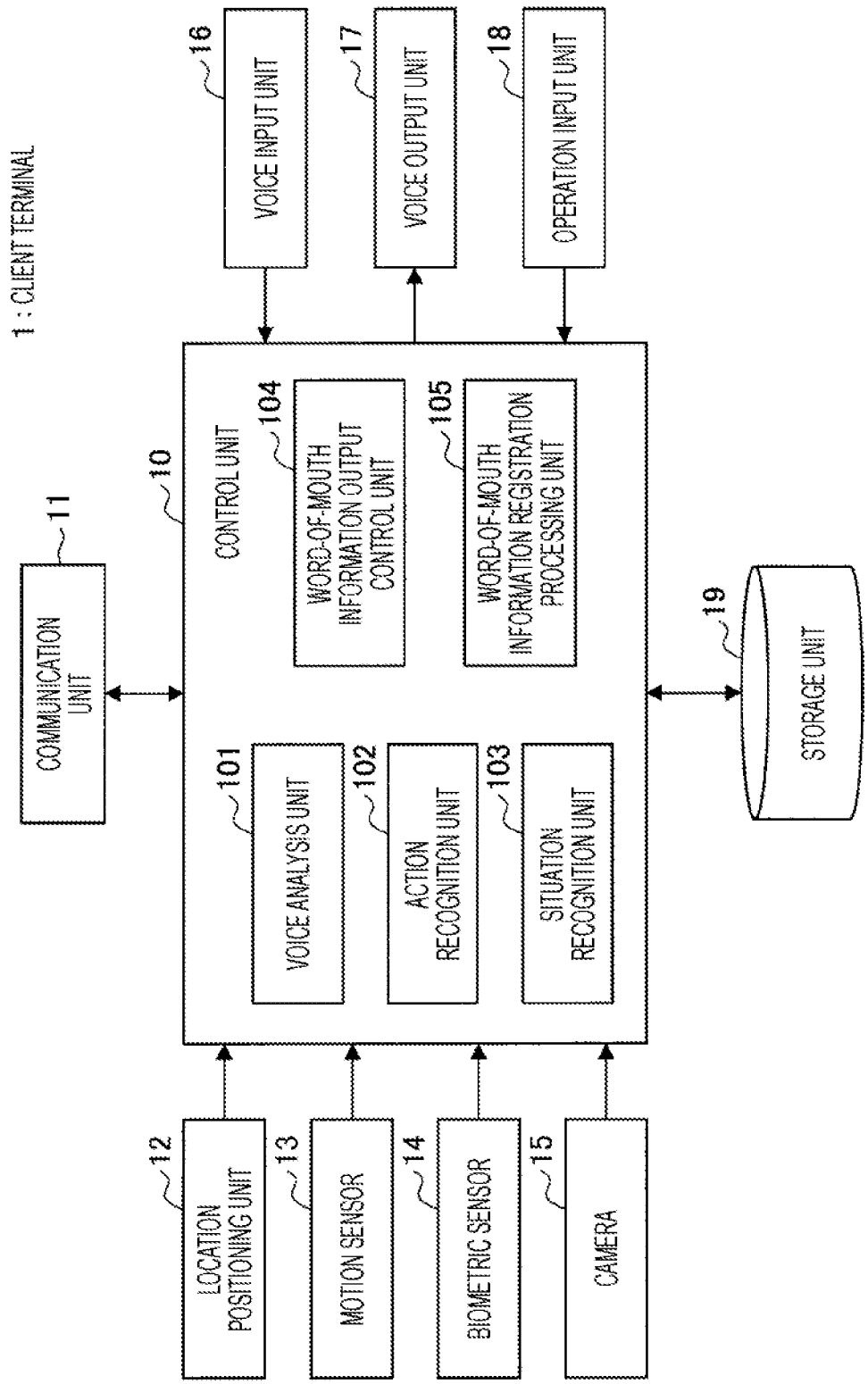
FIG. 3 is a block diagram showing an example of a configuration of a client terminal according to the present embodiment.

FIG. 3 is a block diagram showing an example of a configuration of the client terminal 1 according to the present embodiment. As shown in FIG. 3, the client terminal 1 includes a control unit 10, a communication unit 11, a location positioning unit 12, a motion sensor 13, a biometric sensor 14, a camera 15, a voice input unit 16, a voice output unit 17, an operation input unit 18, and a storage unit 19.

(Control Unit 10)

The control unit 10 functions as an arithmetic processing device and a control device, and controls an overall operation in the client terminal 1 in accordance with various programs. The control unit 10 is realized by, for example, an electronic circuit such as a central processing unit (CPU) or a microprocessor. Furthermore, the control unit 10 may include a read only memory (ROM) that stores programs, operation parameters, and the like to be used, and a random access memory (RAM) that temporarily stores parameters and the like that change appropriately.

Furthermore, the control unit 10 according to the present embodiment also functions as a voice analysis unit 101, an action recognition unit 102, a situation recognition unit 103, a word-of-mouth information output control unit 104, and a word-of-mouth information registration processing unit 105.

Voice Analysis Unit 101

The voice analysis unit 101 analyzes voice information (user speech, another user speech, or environmental sound) inputted by the voice input unit 16. For example, the voice analysis unit 101 recognizes speech voice, converts into text, and performs morphological analysis, semantic analysis, and the like of text (character string). Furthermore, the voice analysis unit 101 can also extract a voice feature amount from an analysis result of the speech voice, and compare with a user's voice feature amount registered in advance, to perform voiceprint authentication. Furthermore, the voice analysis unit 101 can analyze environmental sound to recognize a situation around the user.

Action Recognition Unit 102

The action recognition unit 102 recognizes user's action (action such as walking, running, standing, bicycling movement, or train movement, and motion such as turning around or gazing, and the like), on the basis of information acquired by at least one of the location positioning unit 12, the motion sensor 13, the biometric sensor 14, the camera 15, or the voice input unit 16.

Situation Recognition Unit 103

The situation recognition unit 103 recognizes a user situation (an activity situation such as a walking speed, a physical condition such as a fatigue degree, a mental condition such as a degree of happiness or excitement, and the like) and a peripheral situation (such as being crowded, indoor, or outdoor) on the basis of information acquired by at least one of the location positioning unit 12, the motion sensor 13, the biometric sensor 14, the camera 15, or the voice input unit 16.

Word-of-Mouth Information Output Control Unit 104

The word-of-mouth information output control unit 104 performs control to present (output) word-of-mouth information around the user acquired from the server 2, from the voice output unit 17 to the user. Specifically, the word-of-mouth information output control unit 104 performs control to transmit location information measured by the location positioning unit 12 from the communication unit 11 to the server 2 to request distribution of the word-of-mouth information, and output, by voice, the word-of-mouth information transmitted around the user (for example, within a range of a radius of 300 m and the like) and transmitted from the server 2. Meanwhile, the word-of-mouth information transmitted from the server 2 according to the present embodiment may be relatively new data transmitted within a predetermined time (for example, within 10 minutes, within one hour, within half a day, within one week, and the like) from the present. Furthermore, the word-of-mouth information output control unit 104 can continuously transmit location information to the server 2 to acquire word-of-mouth information, and can continue to properly present word-of-mouth information of the vicinity even when the user is moving.

The presented word-of-mouth information is voice that has been recorded and transmitted by another user as described later. Therefore, although there is a case where noise such as environmental sound is included, the word-of-mouth information output control unit 104 can emphasize and reproduce only human voice. Furthermore, the word-of-mouth information output control unit 104 can also detect specific noise or stationary sound, suppress sound volume of these bands, amplifies a desired sound, and the like, to emphasize the target sound (person, environmental sound).

Furthermore, in the present embodiment, since word-of-mouth speech information is outputted by voice, unlike a display output by text, a certain range (section) must be reproduced cognitively in a time direction. The time for sequentially reproducing a large number of pieces of word-of-mouth information can be secured in a case where the user remains within a certain range. However, such time cannot be secured in a case where the user is moving, and furthermore, it takes time if all the large number of pieces of word-of-mouth information is reproduced sequentially. Therefore, the word-of-mouth information output control unit 104 according to the present embodiment can, for example, appropriately mix a large number of pieces of word-of-mouth information to shorten the reproduction time.

Figure 4:
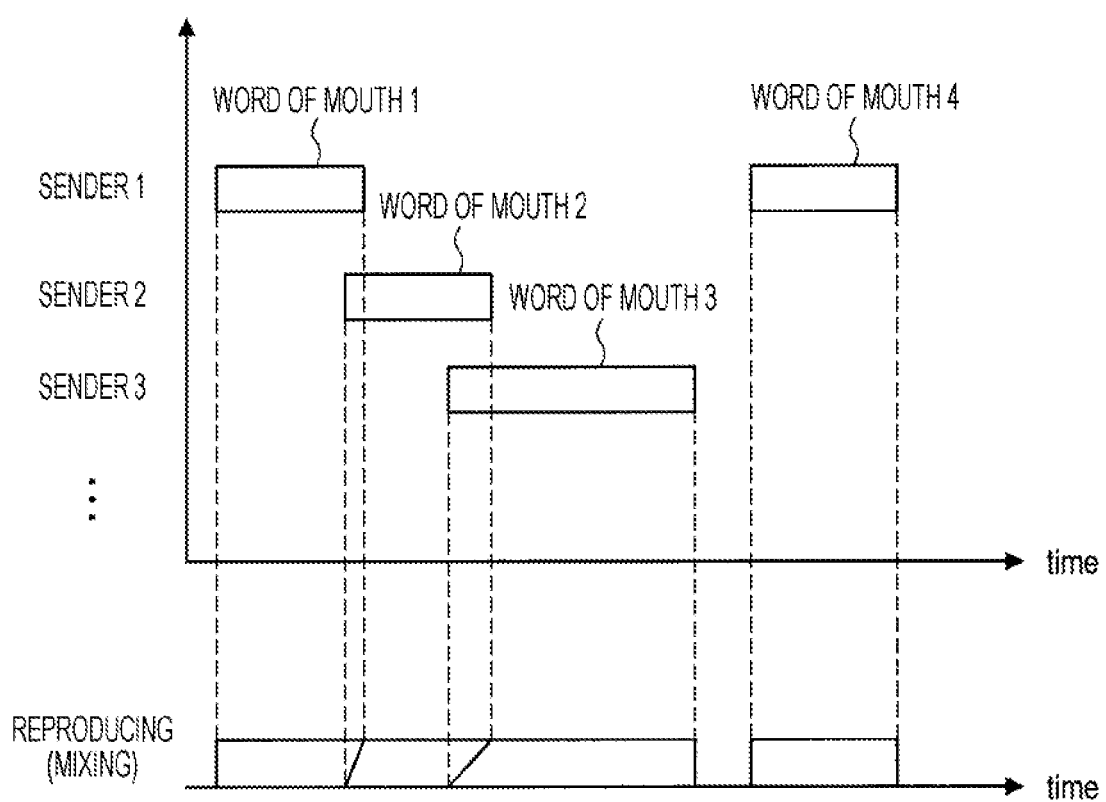
FIG. 4 is a view for explaining an example of mixing of word-of-mouth information according to the present embodiment.

Here, an example of mixing of word-of-mouth information will be described with reference to FIG. 4. As shown in FIG. 4, for example, in a case where there are multiple pieces of word-of-mouth information (word of mouth 1 to word of mouth 4), word-of-mouth information registered earlier may be sequentially mixed and reproduced in consideration of a time interval of actual transmission on the basis of a transmission time of each piece of word-of-mouth information. In a portion where the reproduction times overlap, word-of-mouth voice may be made to fade in and out.

Furthermore, the word-of-mouth information output control unit 104 may individually extract and connect a part (for example, five seconds at the beginning each) of a large number of pieces of word-of-mouth information, to shorten the entire reproduction time.

By aggregating and presenting the large number of pieces of word-of-mouth information by voice in this way, it becomes possible to appropriately present the word-of-mouth information even while the user is moving, for example, by outputting the word-of-mouth information transmitted within 15 minutes around the user in about 10 seconds. Furthermore, in a case where the user stays at the site afterward, for example, the next word-of-mouth information may be reproduced without being aggregated (in real time) since the word-of-mouth information within 15 minutes has already been outputted. In a case where the transmitted word-of-mouth information is presented to the user in substantially real time, sound volume may be adjusted with priority given to the latest word-of-mouth information, in a case where multiple pieces of word-of-mouth information overlap.

Furthermore, the word-of-mouth information output control unit 104 may narrow down and reproduce word-of-mouth information with any filtering, in accordance with a request from the user or a user situation. For example, if the user seems to be tired, word-of-mouth information regarding a resting place such as a cafe or a park is preferentially reproduced. Furthermore, in accordance with user's taste and preferences entered in initial setting, word-of-mouth information that seems to be liked by the user may be reproduced preferentially (for example, in a case where the user likes Spanish food, a lot of word-of-mouth information regarding Spanish food is presented). Furthermore, priority may be given to word-of-mouth information transmitted by another user who has attribute (such as age, sex, and taste) similar to that of the user. More specifically, for example, the word-of-mouth information output control unit 104 scores each piece of word-of-mouth information on the basis of what is prioritized, and presents word-of-mouth information having a high score.

Furthermore, in accordance with user's action, for example, the word-of-mouth information output control unit 104 may give priority, in a case of taking a train, to word-of-mouth information around the next station (to increase the score of the word-of-mouth information around the next station) instead of the current location to present the user, or may give priority, in a case of walking, to word-of-mouth information in a traveling direction (to increase the score of the word-of-mouth information in the traveling direction) to present to the user.

Moreover, the word-of-mouth information output control unit 104 may narrow down in accordance with importance of each piece of word-of-mouth information. For example, in a case where an amount of word-of-mouth information transmitted from a specific place is more than that of other places, some excitement is presumed at that place. Therefore word-of-mouth information of the specific place may be determined to be important (excited), and may be presented preferentially. Furthermore, in consideration of regional characteristics (such as parks, stations, restaurants, and sightseeing spots), word-of-mouth information transmitted at a characteristic place may be determined to be important and presented preferentially. Furthermore, as described later, in a case where word-of-mouth information is being evaluated, word-of-mouth information with high evaluation or word-of-mouth information of a sender with high evaluation may be determined to be important, and may be presented preferentially.

Furthermore, the word-of-mouth information output control unit 104 may integrate similar pieces of word-of-mouth information into one piece of word-of-mouth information (by combining contents of word-of-mouth voice), or may select one piece of representative word-of-mouth information from similar pieces of word-of-mouth information. For example, it is assumed a case where a same keyword or a similar keyword is used and similar evaluation is made on a same object.

Moreover, the word-of-mouth information output control unit 104 according to the present embodiment can also realize a directional interface by user's physical motion. Specifically, it becomes possible for the user to actively select and acquire word-of-mouth information linked to any give area, for example, by turning around motion. Here, a word-of-mouth information selection area will be described with reference to FIG. 5.

Figure 5:
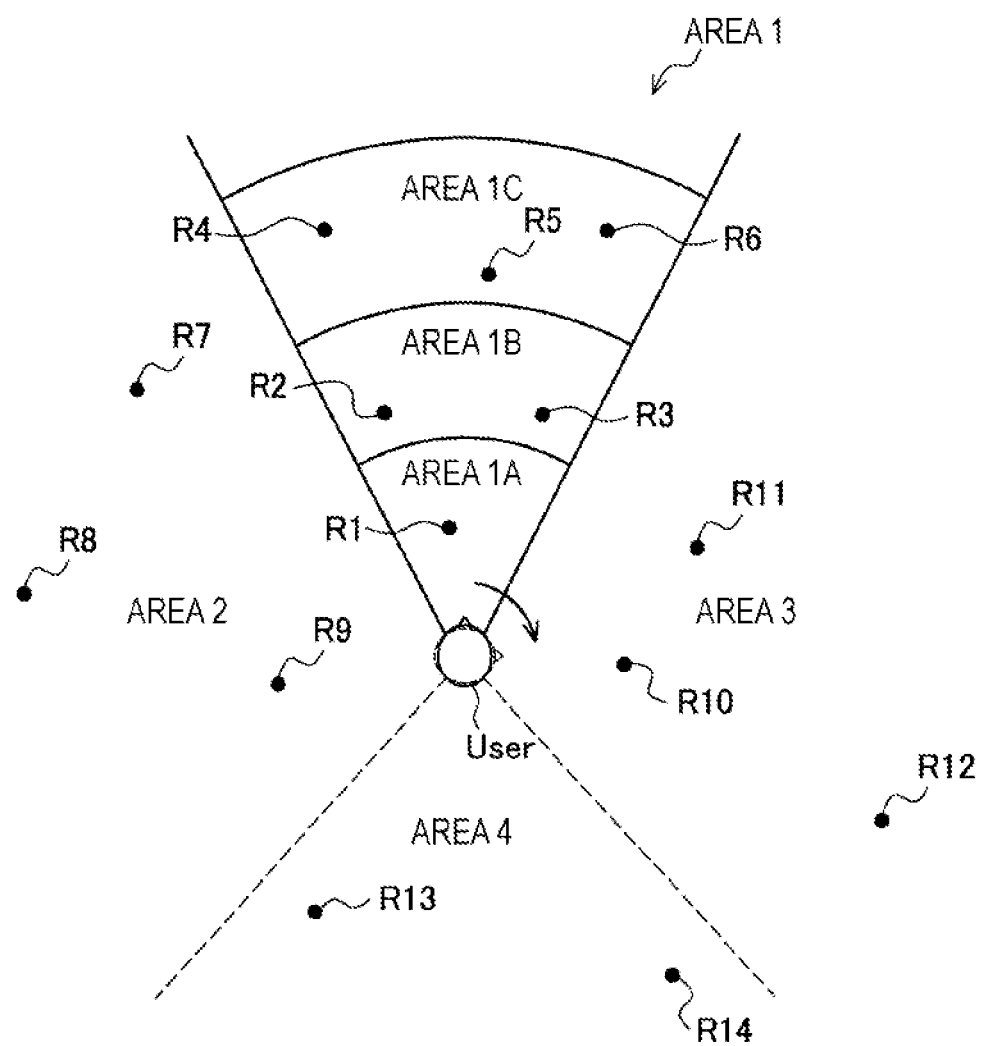
FIG. 5 is a view for explaining a word-of-mouth information selection area according to the present embodiment.

As shown in FIG. 5, for example, the word-of-mouth information output control unit 104 may set a front direction (specifically, a visual field range) of the user as an area 1, left and right lateral directions of the user as an area 2 and an area 3, and a rear direction as an area 4, and may present, by voice, word-of-mouth information (word of mouth R1 to R6) linked to the area 1 (that is, transmitted in the area 1) preferentially (increasing the score of word-of-mouth information in the area 1). More specifically, for example, as described with reference to FIG. 4, a large number of pieces of word-of-mouth information (word of mouth R1 to R14 of the area 1 to the area 4) are mixed, and at this time, the word-of-mouth information of the area 1 is reproduced with sound volume higher than word-of-mouth information of other areas. Furthermore, the word-of-mouth information output control unit 104 may further divide a region of the area 1 into an area 1A closer to the user, an area 1B whose distance from the user is moderate, and an area 1C farther from the user, and may sequentially mix and reproduce word-of-mouth information of the area 1A to the area 1C individually. In particular, in a case where the user is moving, it becomes possible to sequentially present the word-of-mouth information on the traveling direction by sequentially reproducing from the area closer to the user.

Moreover, on the basis of the transmission location information of each piece of word-of-mouth information (word of mouth R1 to R14 of the area 1 to the area 4) and current location information of the user, the word-of-mouth information output control unit 104 determines a sound image localization position of voice of each piece of word-of-mouth information, and performs sound image localization processing on the voice signal. In other words, in order to cause the voice of the word-of-mouth information to be heard from the direction corresponding to the transmission position, the sense of direction and the sense of distance (outside head localization) of the sound are expressed by the sound image localization processing, to give realistic feeling to the user. In particular, when word-of-mouth information is subjected to sound image localization and reproduced with the open-ear earphone or the neck speaker as shown in FIG. 1, the word-of-mouth information is integrated with actual surrounding environmental sound, and heard from the front and back in the crowd.

Here, in a case where the user has turned around in the direction of the area 3 as shown in FIG. 5 as being curious about the word-of-mouth information heard from the direction of the area 3 even with small sound volume, the word-of-mouth information output control unit 104 performs switching so as to present the word-of-mouth information (word of mouth R10 to R12) in the area 3 preferentially (for example, by raising the sound volume). As described above, in the present embodiment, it is possible to realize a directional interface by physical motion of the user. Note that the motion of turning around has been mentioned as an example here, but the present embodiment is not limited to this.

Furthermore, in a case where the user is standing and listening (in a case where the concentration level is high), looking around, or the like, the word-of-mouth information output control unit 104 may entirely raise the sound volume of the word-of-mouth information to emphasize, or may increase the amount of word-of-words to be presented, since it can be presumed that the user is interested in the word-of-mouth information of the vicinity.

Figure 6:
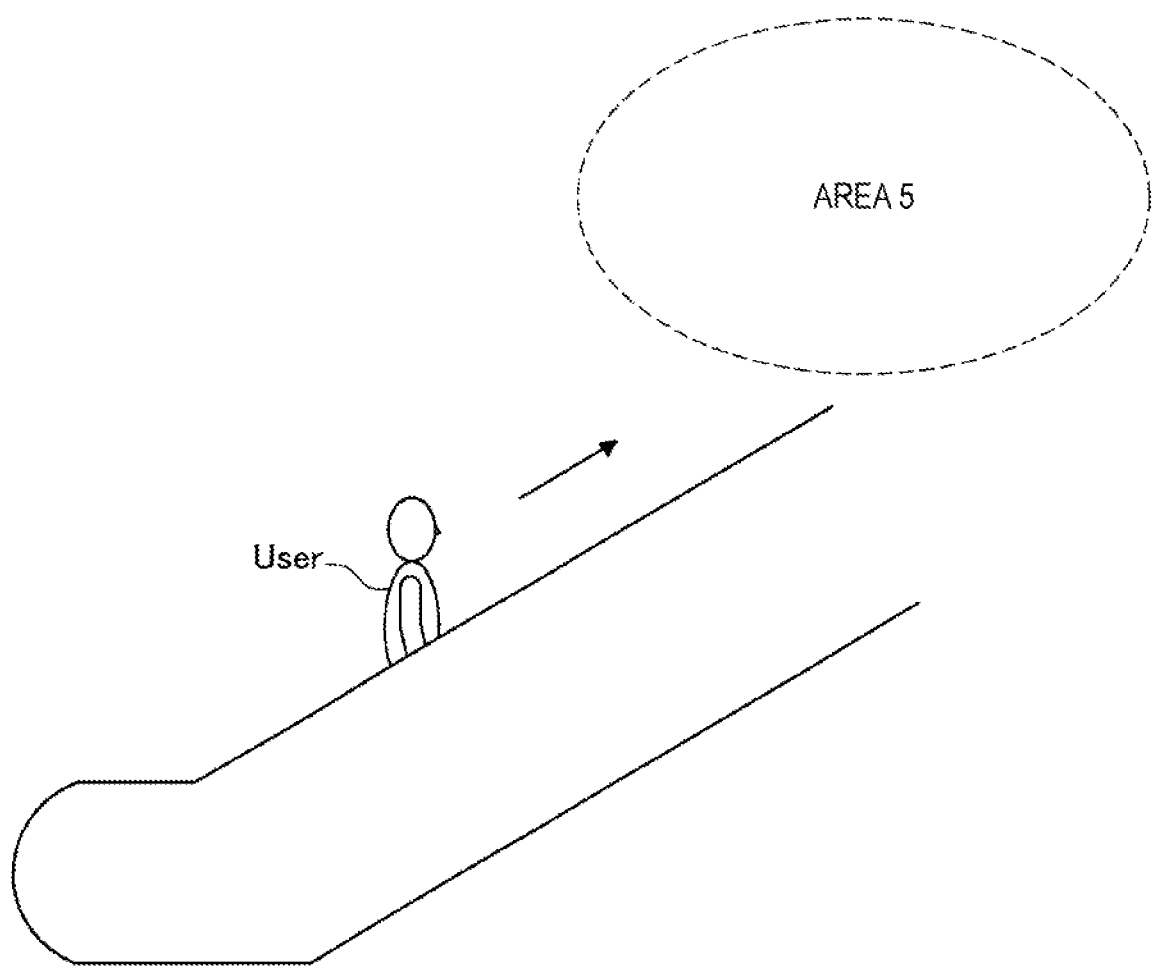
FIG. 6 is a view for explaining another word-of-mouth information selection area according to the present embodiment.

Furthermore, the direction for which the word-of-mouth information of the area is prioritized to the user is not limited to the direction described with reference to FIG. 5, and a vertical direction may also be considered. FIG. 6 is a view for explaining another word-of-mouth information selection area according to the present embodiment.

As shown in FIG. 6, for example, in a case where the user is going to an upper floor by an escalator and the like, the word-of-mouth information output control unit 104 may present word-of-mouth information transmitted in an area 5 by voice as if being heard from above by sound image localization with priority given to the upper floor area (area 5), which is the traveling direction.

Furthermore, in a case where the user is in a state of gazing, such as a case where the user is closely looking at a certain direction even after presentation of word-of-mouth information of the vicinity, the word-of-mouth information output control unit 104 can further acquire word-of-mouth information on the use's gaze direction (the direction in which the user is facing can be detected by the motion sensor 13) and can give voice presentation. With this configuration, it becomes possible to intuitively acquire word-of-mouth information of distant places (such as several kilometers or several tens of kilometers) on the gaze direction. At this time, in consideration of regional characteristics, word-of-mouth information transmitted at a characteristic place, for example, such as a station, a park, or an event venue may be selected and presented, among the word-of-mouth information located on the user's gaze direction. Alternatively, the word-of-mouth information output control unit 104 may select and present word-of-mouth information transmitted at places where the user often visits usually.

Furthermore, in a case of being able to recognize a target being gazed by the user by analyzing a captured image by the camera 15, the word-of-mouth information output control unit 104 may acquire word-of-mouth information regarding the target from the server 2 and present to the user.

Furthermore, since awareness of a surrounding environment may be reduced if the user concentrates on listening to word-of-mouth information too much, and for example, a dangerous state may occur without noticing of an approaching vehicle, the word-of-mouth information output control unit 104 can appropriately perform control to reduce sound volume of word-of-mouth information such that the actual environmental sound can also be heard, depending on a user situation (such as moving speed and location) and a peripheral situation (such as, car traffic is heavy). A ratio of the sound volume of the word-of-mouth information to the environmental sound may be changed, for example, in accordance with a moving speed of the user. Specifically, for example, the ratio may be 5:5 when the user is walking slowly, 2:8 when trotting, and 8:2 when stopped.

Word-of-Mouth Information Registration Processing Unit 105

The word-of-mouth information registration processing unit 105 performs processing for registering word-of-mouth information in the server 2. The word-of-mouth information registration processing unit 105 executes the registration processing by transmitting voice data inputted by the voice input unit 16, to the server 2 as word-of-mouth information. The user can easily register word-of-mouth information instantly anytime and anywhere, simply by muttering. Furthermore, the word-of-mouth information registration processing unit 105 transmits current location information measured by the location positioning unit 12 together with the word-of-mouth information. Furthermore, the word-of-mouth information registration processing unit 105 may additionally transmit a peripheral situation (such as a crowded situation, and the presence and absence of surrounding people) recognized by the situation recognition unit 103, environmental information (such as temperature and weather) detected by an environmental sensor (not shown), and a user attribute (such as ID, age, gender, and taste of a sender).

Sound collection of word-of-mouth information is started when intentional operation by the user, such as pressing of a button provided on the client terminal 1 or a voice command with a predetermined keyword (such as "word of mouth"), or a specific gesture (such as putting a hand on the mouth) is made. With the voice input unit 16, the word-of-mouth information registration processing unit 105 collects (records) sound for a predetermined time (for example, 10 seconds and the like) after such action (hereinafter, also referred to as "registration start trigger") is made, or collects speech of one phrase, and acquires as word-of-mouth information. Furthermore, in a case where the registration start trigger is continuously performed, the sound collection (recording) time may be extended.

Furthermore, the recording of the word-of-mouth voice is not limited to the method of performing in a case where intentional action is performed, and the client terminal 1 may be always fixed in the word-of-mouth transmission mode. In this case, the word-of-mouth information registration processing unit 105 automatically discriminates and extracts a word-of-mouth speech portion and acquires word-of-mouth information, on the basis of an analysis result by the voice analysis unit 101 on the speech voice collected by the voice input unit 16.

Furthermore, the word-of-mouth information registration processing unit 105 can also complement the collected voice from action of the user and a peripheral situation, and then transmit to the server 2 as word-of-mouth information. For example, in a case of voice containing an instruction word or a case where a subject and a purpose are omitted, such as "this is delicious", "a music event seems to start here", or "cost performance of this shop is very good", it may be impossible to know what the word-of-mouth information is related to. Therefore, place information (place ID) based on object recognition from a captured image captured by the camera 15 or current location information measured by the location positioning unit 12 may be identified by the situation recognition unit 103, and may be used for complementation.

Moreover, the word-of-mouth information registration processing unit 105 can also generate word-of-mouth information on the basis of user's action (so-called context). For example, in a case where the user is standing and gives voice of exclamation while staring at a poster advertisement, word-of-mouth information such as "○○ is cool" or "I want to watch □□ (movie)" is generated in relation to the poster advertisement. The contents of the poster advertisement can be captured by the camera 15 and acquired by image analysis. Furthermore, the voice in this case may be synthesized by an average voice based on the user attribute.

Meanwhile, the word-of-mouth information registration processing unit 105 may acquire, as word-of-mouth information, speech contents of an opposite user who is interacting with the user, without limiting to the user's speech.

(Communication Unit 11)

The communication unit 11 is connected to the network 3 by wire or wirelessly, and exchanges data with the server 2 on the network. The communication unit 11 is communicably connected with the network 3, for example, through a wired/wireless local area network (LAN) or Wi-Fi (registered trademark), a mobile communication network (long term evolution (LTE)), 3G (third generation mobile communication system)), or the like.

(Location Positioning Unit 12)

The location positioning unit 12 has a function of detecting a current location of the client terminal 1 on the basis of an acquisition signal from the outside. Specifically, for example, the location positioning unit 12 is realized by a global positioning system (GPS) positioning unit, receives a radio wave from the GPS satellite, detects a location where the client terminal 1 is present, and outputs the detected location information to the control unit 10. Furthermore, in addition to the GPS, the location positioning unit 12 may detect a location through transmission and reception to and from, for example, Wi-Fi (registered trademark), Bluetooth (registered trademark), a mobile phone, a PHS, a smartphone, and the like, or short distance communication and the like.

(Motion Sensor 13)

The motion sensor 13 is a detection unit that detects movement of the user, and is realized by, for example, an acceleration sensor, a gyro sensor, a geomagnetic sensor, or the like.

(Biometric Sensor 14)

The biometric sensor 14 is a detection unit that detects biometric information of the user, and is realized by, for example, a body temperature sensor, a vein sensor, a pulse sensor, a heart rate sensor, a sweat sensor, an electroencephalogram sensor, or the like. The biometric sensor 14 is provided at a position that contacts (or approaches) the user's body when the client terminal 1 is worn by the user as shown in FIG. 1, and can detect the user's biometric information when worn.

(Camera 15)

The camera 15 has: a lens system including an imaging lens, an aperture, a zoom lens, a focus lens, and the like; a drive system that causes the lens system to perform focusing operation and zooming operation; and a solid-state imaging element array that performs photoelectric conversion on imaging light obtained by the lens system to generate an imaging signal and the like. The solid-state imaging element array may be realized by, for example, a charge coupled device (CCD) sensor array or a complementary metal oxide semiconductor (CMOS) sensor array. Further, as shown in FIG. 1, the camera 15 according to the present embodiment may be provided at either left or right distal end of the main body part 110 such that at least a forward direction of the user is included in an imaging range when the client terminal 1 is worn by the user. Furthermore, the camera 15 may be movable, and can be directed vertically or horizontally in accordance with the user's voice instruction, and can automatically rotate so as to maintain the horizontal orientation in accordance with the detection result of the motion sensor 13.

(Voice Input Unit 16)

The voice input unit 16 is realized by a microphone, a microphone amplifier unit to amplify and process a voice signal obtained by the microphone, and an A/D converter to perform digital conversion into a voice signal, and outputs the voice signal to the control unit 10. Furthermore, by generation of directional or nondirectional beams by a plurality of microphones, the voice input unit 16 can dynamically separate and collect sound of speech of the user, speech of another user (opposite person who is facing and talking to the user), and surrounding environmental sound. Furthermore, for sound sources with overlapping beam directions, it is also possible to intensively collect the desired sound source by raising an S/N ratio in accordance with characteristics (such as a frequency band and a section length) of the desired sound source (user's speech, another user, or environmental sound).

(Voice Output Unit 17)

The voice output unit 17 has a speaker to reproduce a voice signal, and an amplifier circuit for the speaker.

(Operation Input Unit 18)

The operation input unit 18 receives an operation instruction from the user, and outputs the content of the operation to the control unit 10. The operation input unit 18 may be a touch sensor, a pressure sensor, or a proximity sensor. Alternatively, the operation input unit 18 may have a physical configuration such as a button, a switch, and a lever.

(Storage Unit 19)

The storage unit 19 is realized by a read only memory (ROM) that stores programs, operation parameters, and the like to be used for processing of the control unit 10, and a random access memory (RAM) that temporarily stores parameters and the like that change appropriately.

The configuration of the client terminal 1 according to the present embodiment has been specifically described above. Note that the configuration of the client terminal 1 is not limited to the example shown in FIG. 3. For example, the client terminal 1 may further include an environment sensor (such as an illuminance sensor, a temperature sensor, an air pressure sensor, a rain sensor, or a wind sensor).

<2-2. Configuration of Server 2>

Figure 7:
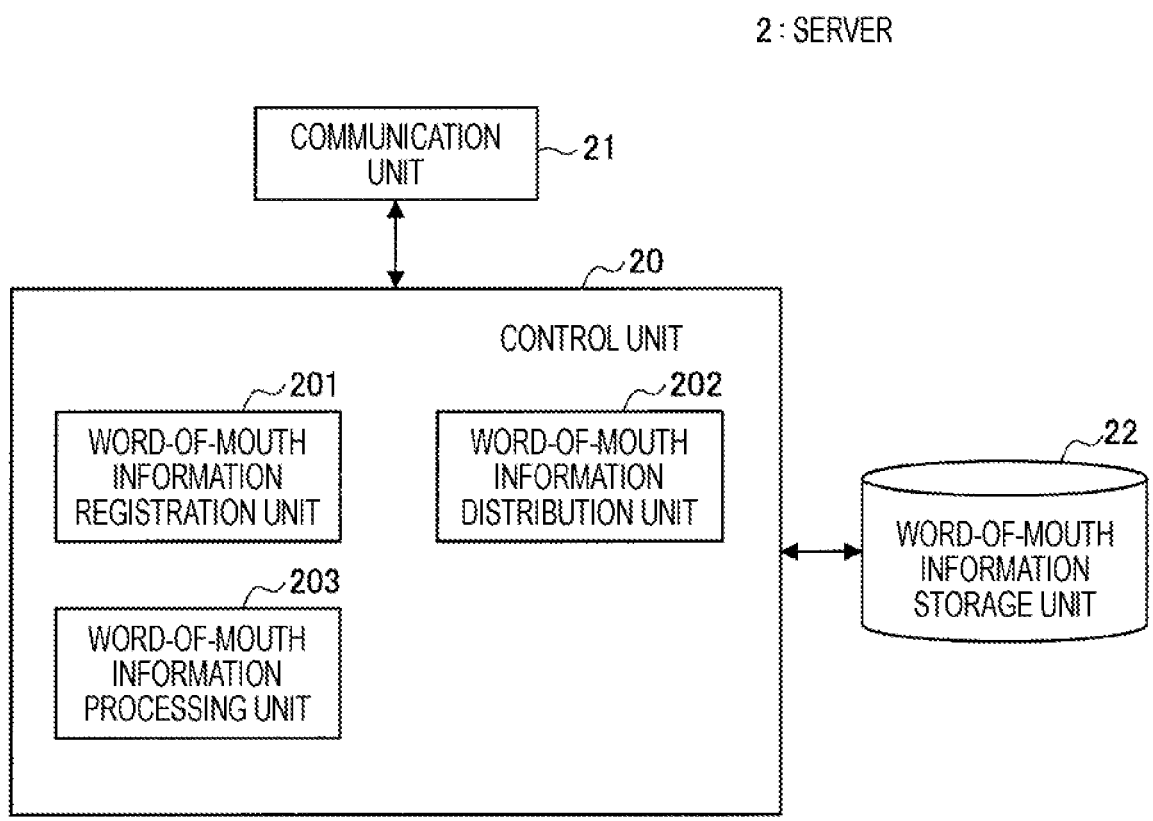
FIG. 7 is a block diagram showing an example of a configuration of a server according to the present embodiment.

FIG. 7 is a block diagram showing an example of a configuration of the server 2 according to the present embodiment. As shown in FIG. 7, the server 2 includes a control unit 20, a communication unit 21, and a word-of-mouth information storage unit 22.

(Control Unit 20)

The control unit 20 functions as an arithmetic processing unit and a control unit, and controls an overall operation in the server 2 in accordance with various programs. The control unit 20 is realized by, for example, an electronic circuit such as a central processing unit (CPU) or a microprocessor. Furthermore, the control unit 20 may include a read only memory (ROM) that stores programs, operation parameters, and the like to be used, and a random access memory (RAM) that temporarily stores parameters and the like that change appropriately.

Furthermore, the control unit 20 according to the present embodiment also functions as a word-of-mouth information registration unit 201, a word-of-mouth information processing unit 203, and a word-of-mouth information distribution unit 202.

The word-of-mouth information registration unit 201 stores word-of-mouth information transmitted from the client terminal 1 in the word-of-mouth information storage unit 22, together with location information of the client terminal 1, the date and time (transmission date and time), and a user attribute (such as ID, age, gender, and taste of a sender). Furthermore, the word-of-mouth information registration unit 201 may analyze the content of word-of-mouth information, and may further link a category and a keyword of the word-of-mouth information. Furthermore, in a case where the client terminal 1 additionally transmits a peripheral situation and an environmental situation, the word-of-mouth information registration unit 201 associates and stores these in the word-of-mouth information storage unit 22.

In accordance with a request from the client terminal 1, the word-of-mouth information distribution unit 202 performs control to: refer to location information of the client terminal 1; extract, from the word-of-mouth information storage unit 22, word-of-mouth information transmitted within a predetermined time (for example, within one hour and the like) around the user (for example, a radius of 300 m and the like); transmit to the client terminal 1 of the request source; and present by voice to the user. Ranges of the distance and the time may be set as appropriate. For example, the distance may be extended in accordance with a movement situation of the user (walking, running, riding a bicycle, taking a train). For example, the range may include up to the next station in a case where the user is taking a train, or may include up to several kilometers ahead of a traveling direction in a case where the user is walking or running. Furthermore, in a case where an amount of word-of-mouth information within a predetermined time is less than a predetermined value, the time may be further traced back.

The word-of-mouth information processing unit 203 processes word-of-mouth information to be registered or distributed as necessary. For example, from the viewpoint of privacy protection, there is a possibility that the sender is identified if there are few people around the sender, and the word-of-mouth information registered by voice is presented to a recipient as it is. In this case, the word-of-mouth information processing unit 203 can perform privacy protection in accordance with a request from the sender or a crowded situation around the sender. Specifically, for example, the word-of-mouth information processing unit 203 changes voice tone to avoid personal identification by voice, or averages or combines with similar word-of-mouth information. Note that the control unit 20 can also be configured not to distribute word-of-mouth information in a case where possibility of identification is high and the like even with some processing, such as in a case of one sender and one recipient.

Furthermore, the word-of-mouth information processing unit 203 may perform special acoustic processing on the voice of the word-of-mouth information to be distributed, to facilitate distinction from sound in the real space. With this configuration, it is possible to avoid dangerous action such as a decrease of awareness of the surrounding environment as the user concentrates too much on hearing the word-of-mouth information, or sudden stop as assuming the word-of-mouth information notifying danger as actual voice. Such processing may be appropriately performed depending on a user situation (such as moving speed and location) and a peripheral situation (such as, car traffic is heavy).

Meanwhile, the control unit 20 can also perform evaluation on word-of-mouth information and a sender of word-of-mouth information, on the basis of positive feedback from a recipient of the word-of-mouth information, a utilization level, and the like. As the positive feedback from the recipient, for example, a case is assumed where the recipient performs some action (such as button operation, voice, gesture, or improvement of emotion (detected from biometric information and the like) indicating evaluation for the presented word-of-mouth information. Furthermore, the utilization level is a utilization rate by the recipient of the presented word-of-mouth information, for example, and may be updated in a case where there is some change in action of the recipient (such as in a case where a traveling direction is changed) in accordance with the presented word-of-mouth information. Then, the control unit 20 feeds back such evaluation on the word-of-mouth information and the sender of the word-of-mouth information audibly, visually, or tactilely (such as vibration) to the sender, which makes it possible to motivate to take action for further transmitting word-of-mouth information.

(Communication Unit 21)

The communication unit 21 is connected to the network 3 by wire or wireless, and exchanges data with each client terminal 1 via the network 3. The communication unit 21 is communicably connected with the network 3 by, for example, a wired/wireless local area network (LAN), wireless fidelity (Wi-Fi, registered trademark), or the like.

(Word-of-Mouth Information Storage Unit 22)

The word-of-mouth information storage unit 22 stores word-of-mouth information transmitted from each client terminal 1. Word-of-mouth information may be stored in association with: a user attribute (such as age, gender, and taste); information regarding a location (such as location information, temperature, weather, and a crowded situation); information regarding time (Greenwich mean time (GMT), a specific event, an event schedule); and information regarding contents (such as a keyword and a category). Information such as specific events and event schedules may be generated by the word-of-mouth information registration unit 201 by searching for event information from the network if necessary, on the basis of a transmission location and transmission date and time of the word-of-mouth information, contents of the word-of-mouth information, and the like.

Furthermore, the word-of-mouth information storage unit 22 includes a storage device including: a storage medium; a recording device to record data on the storage medium; a reading device to read data from the storage medium; a deletion device to delete data recorded in the storage medium; and the like.

The configuration of the server 2 according to the present embodiment has been specifically described above. Note that the configuration of the server 2 according to the present embodiment is not limited to the example shown in FIG. 7. For example, the functions of the word-of-mouth information output control unit 104 and the word-of-mouth information registration processing unit 105 of the client terminal 1 described with reference to FIG. 3 may be further provided.

3. OPERATION PROCESSING

Subsequently, operation processing of the information processing system according to the present embodiment will be specifically described with reference to the drawings.

<3-1. Word-of-Mouth Information Registration Processing>

Figure 8:
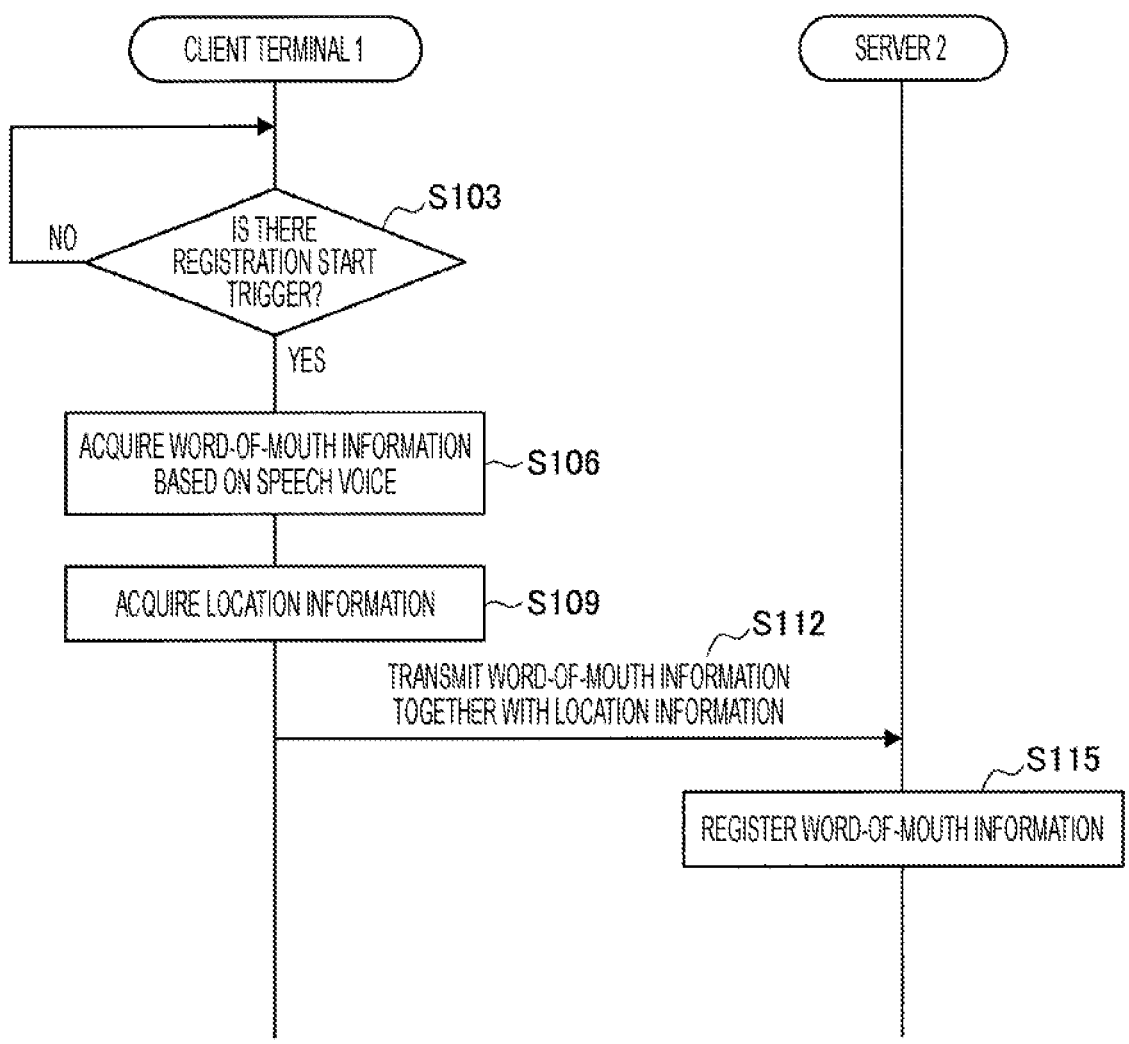
FIG. 8 is a sequence diagram showing registration processing of word-of-mouth information according to the present embodiment.

FIG. 8 is a sequence diagram showing registration processing of word-of-mouth information according to the present embodiment.

As shown in FIG. 8, first, in a case where the client terminal 1 detects a registration start trigger (step S103), the word-of-mouth information registration processing unit 105 acquires word-of-mouth information on the basis of speech voice of the user inputted from the voice input unit 16 (step S106). Specifically, for example, the word-of-mouth information registration processing unit 105 records voice for a predetermined time after the detection of the registration start trigger, and acquires word-of-mouth information by voice.

Next, the word-of-mouth information registration processing unit 105 acquires location information by the location positioning unit 12 (step S109), and transmits the word-of-mouth information to the server 2 together with the location information (step S112).

Next, the word-of-mouth information registration unit 201 of the server 2 registers the word-of-mouth information transmitted from the client terminal 1 in the word-of-mouth information storage unit 22 (step S115).

<3-2. Word-of-Mouth Information Presentation Processing>

Subsequently, word-of-mouth information presentation processing will be described with reference to FIG. 9. FIG. 9 is a sequence diagram showing the presentation processing of word-of-mouth information according to the present embodiment.

As shown in FIG. 9, first, the client terminal 1 acquires location information (step S203), and performs acquisition request, to the server 2, of word-of-mouth information together with the location information (step S206).

Next, the word-of-mouth information distribution unit 202 of the server 2 extracts, from the word-of-mouth information storage unit 22, the latest word-of-mouth information (within a predetermined time) around the user, on the basis of the received location information (step S209).

Next, the word-of-mouth information distribution unit 202 of the server 2 transmits the extracted word-of-mouth information to the client terminal 1 of the request source (step S212).

Then, the word-of-mouth information output control unit 104 of the client terminal 1 performs control to present the word-of-mouth information received from the server 2 by voice, from the voice output unit 17 (step S215).

By repeating the processing of steps S203 to S215 described above while the user is moving and the like, the user can continuously listen to the relatively new word-of-mouth information in the vicinity, intuitively by voice while walking in the town. Note that presentation of word-of-mouth information according to the present embodiment is not limited to continuous presentation, and may be performed intermittently (for example, periodically).

4. CONCLUSION

As described above, in the information processing system according to the embodiment of the present disclosure, it becomes possible to perform voice presentation, to a user, of information transmitted from another user around the user.

Furthermore, it has been difficult to separate and acquire voice of a specific speaker with high quality in a crowd with conventional voice recorders and the like, but in the present embodiment, it is possible to collect sound at a pinpoint from the user's mouth by camera recognition and a directional microphone.

Furthermore, in a case where the user's voice is collected by the voice input unit 16 provided in the neck band speaker as shown in FIG. 1, it is possible to collect sound with higher accuracy and higher quality since a position (relative relationship) between the user and the voice input unit 16 (microphone) is fixed.

The preferred embodiment of the present disclosure has been described above in detail with reference to the accompanying drawings, but the present technology is not limited to such examples. It is obvious that those with ordinary skill in the technical field of the present disclosure can arrive various variations or modifications within the scope of the technical idea described in the claims, and it is naturally understood that these also fall within the technical scope of the present disclosure.

For example, it is also possible to create a computer program for causing hardware such as the CPU, the ROM, and the RAM contained in the client terminal 1 or the server 2 described above to exhibit the function of the client terminal 1 or the server 2. Furthermore, a computer-readable storage medium storing the computer program is also provided.

Furthermore, in the embodiment described above, the client terminal 1 is realized by a neck band speaker as shown in FIG. 1, but the present embodiment is not limited to this. The client terminal 1 may be realized by another wearable device (such as a smart eyeglass, a smart earring, or a smart headset).

Furthermore, the effects described in the present specification are merely exemplary or illustrative, and not restrictive. That is, the technology according to the present disclosure can exhibit other effects apparent to those skilled in the art from the description of the present specification, in addition to the effect above or instead of the effect above.

Note that the present technology can also have the following configurations.

(1)

An information processing apparatus including a control unit configured to perform control to present, to a user by voice, information that has been transmitted from another user in surroundings of the user, in which the control unit performs control to emphasize and present, by voice, specific information among the information which has been transmitted from another user in surroundings of the user in accordance with a situation of the user.

(2)

The information processing apparatus according to (1) described above, in which the control unit performs control to continuously present, by voice, one or more pieces of word-of-mouth information that has been transmitted from another user within a predetermined time from present, in the surroundings of the user.

(3)

The information processing apparatus according to (2) described above, in which the control unit performs control to emphasize more and present, by voice, word-of-mouth information that has been transmitted in an area in a front direction of the user, as a situation of the user, than word-of-mouth information that has been transmitted in an area in another direction.

(4)

The information processing apparatus according to (3) described above, in which the control unit determines a sound image localization position of the word-of-mouth information on the basis of transmission location information of the word-of-mouth information to be presented and on the basis of location information of the user, and performs sound image localization processing on a voice signal of the word-of-mouth information.

(5)

The information processing apparatus according to (4) described above, in which the control unit performs control to emphasize and present, by voice, word-of-mouth information that has been transmitted in an area in a direction in which the user has turned around, as a situation of the user.

(6)

The information processing apparatus according to (4) described above, in which the control unit performs control to emphasize and present, by voice, word-of-mouth information that has been transmitted in an area of all directions in a case where the user stops, as a situation of the user.

(7)

The information processing apparatus according to (4) described above, in which the control unit performs control to emphasize and present, by voice, word-of-mouth information of an object gazed or on a direction of gazing by the user, as a situation of the user.

(8)

The information processing apparatus according to any one of (2) to (7) described above, in which the control unit emphasizes the word-of-mouth information to be presented, by control of sound volume, noise removal, or suppression or amplification of a desired sound band.

(9)

The information processing apparatus according to any one of (2) to (7) described above, in which the control unit adjusts sound volume of the word-of-mouth information to be presented such that surrounding environmental sound can be heard, in accordance with a movement situation of the user or a peripheral situation.

(10)

The information processing apparatus according to any one of (2) to (9) described above, in which the control unit filters the word-of-mouth information to be presented in accordance with preference information, a current situation, or a movement situation of the user, as a situation of the user.

(11)

The information processing apparatus according to any one of (2) to (10) described above, in which the control unit filters the word-of-mouth information to be presented in accordance with a degree of importance or evaluation of the word-of-mouth information.

(12)

The information processing apparatus according to any one of (2) to (11) described above, in which the control unit integrates one or more pieces of the word-of-mouth information to be presented.

(13)

The information processing apparatus according to (12) described above, in which, the control unit performs control to continuously present, by voice, word-of-mouth information that has been transmitted in real time, in a case where there is no change in a location of the user after integrating and reproducing one or more pieces of word-of-mouth information from present to a predetermined time ago.

(14)

The information processing apparatus according to any one of (2) to (13) described above, in which voice of the word-of-mouth information to be presented is processed in a voice tone in order to avoid identification of individual, in accordance with a crowded situation in surroundings of a sender.

(15)

The information processing apparatus according to any one of (2) to (14) described above, in which the control unit acquires feedback of the user on the presented word-of-mouth information, and associates as evaluation information for the word-of-mouth information.

(16)

The information processing apparatus according to any one of (2) to (15) described above, in which the control unit registers, as word-of-mouth information, collected speech voice of a user.

(17)

The information processing apparatus according to (16) described above, in which the control unit complements the speech voice in accordance with a user context, and then registers as the word-of-mouth information.

(18)

The information processing apparatus according to any one of (1) to (17) described above, in which the information processing apparatus includes a neck band speaker.

(19)

An information processing method including:

by a processor, performing control to present, to a user by voice, information that has been transmitted from another user in surroundings of the user, in which control is further performed to emphasize and present, by voice, specific information among the information which has been transmitted from another user in surroundings of the user, in accordance with a situation of the user.

(20)

A program for causing a computer to function as a control unit that performs control to present, to a user by voice, information that has been transmitted from another user in surroundings of the user, in which the control unit performs control to emphasize and present, by voice, specific information among the information which has been transmitted from another user in surroundings of the user, in accordance with a situation of the user.

REFERENCE SIGNS LIST

1 Client terminal
10 Control unit
101 Voice analysis unit
102 Action recognition unit
103 Situation recognition unit
104 Word-of-mouth information output control unit
105 Word-of-mouth information registration processing unit
11 Communication unit
12 Location positioning unit
13 Motion sensor
14 Biometric sensor
15 Camera
16 Voice input unit
17 Voice output unit
18 Operation input unit
19 Storage unit
110 Main body part
120 Earphone
2 Server
20 Control unit
201 Word-of-mouth information registration unit
202 Word-of-mouth information distribution unit 203 Word-of-mouth information processing unit
21 Communication unit
22 Word-of-mouth information storage unit
3 Network

The invention claimed is:

1. An information processing apparatus comprising a control unit configured to control presenting, to a user of the information processing apparatus by voice, information that has been transmitted from another user of another information processing apparatus in surroundings of the user, wherein
the control unit controls an output unit to emphasize and present, by voice, specific information among the information which has been transmitted from the another user in surroundings of the user, in accordance with a situation of the user, wherein the situation of the user comprises one or more of a fatigue degree of the user, a degree of happiness of the user, a degree of excitement of the user, whether the user is in heavy traffic, or whether the user is being crowded.

2. The information processing apparatus according to claim 1, wherein the control unit performs control to continuously present, by voice, one or more pieces of word-of-mouth information that has been transmitted from another user within a predetermined time from present, in the surroundings of the user.

3. The information processing apparatus according to claim 2, wherein the control unit performs control to emphasize more and present, by voice, word-of-mouth information that has been transmitted in an area in a front direction of the user, as a situation of the user, than word-of-mouth information that has been transmitted in an area in another direction.

4. The information processing apparatus according to claim 3, wherein the control unit determines a sound image localization position of the word-of-mouth information on a basis of transmission location information of the word-of-mouth information to be presented and on a basis of location information of the user, and performs sound image localization processing on a voice signal of the word-of-mouth information.

5. The information processing apparatus according to claim 4, wherein the control unit performs control to emphasize and present, by voice, word-of-mouth information that has been transmitted in an area in a direction in which the user has turned around, as a situation of the user.

6. The information processing apparatus according to claim 4, wherein the control unit performs control to emphasize and present, by voice, word-of-mouth information that has been transmitted in an area of all directions in a case where the user stops, as a situation of the user.

7. The information processing apparatus according to claim 4, wherein the control unit performs control to emphasize and present, by voice, word-of-mouth information of an object gazed or on a direction of gazing by the user, as a situation of the user.

8. The information processing apparatus according to claim 2, wherein the control unit emphasizes the word-of-mouth information to be presented, by control of sound volume, noise removal, or suppression or amplification of a desired sound band.

9. The information processing apparatus according to claim 2, wherein the control unit adjusts sound volume of the word-of-mouth information to be presented, to allow surrounding environmental sound to be heard, in accordance with a movement situation of the user or a peripheral situation.

10. The information processing apparatus according to claim 2, wherein the control unit filters the word-of-mouth information to be presented in accordance with preference information, a current situation, or a movement situation of the user, as a situation of the user.

11. The information processing apparatus according to claim 2, wherein the control unit filters the word-of-mouth information to be presented in accordance with a degree of importance or evaluation of the word-of-mouth information.

12. The information processing apparatus according to claim 2, wherein the control unit integrates one or more pieces of the word-of-mouth information to be presented.

13. The information processing apparatus according to claim 12, wherein the control unit performs control to continuously present, by voice, word-of-mouth information that has been transmitted in real time, in a case where there is no change in a location of the user after integrating and reproducing one or more pieces of word-of-mouth information from present to a predetermined time ago.

14. The information processing apparatus according to claim 2, wherein voice of the word-of-mouth information to be presented is processed in a voice tone in order to avoid identification of individual, in accordance with a crowded situation in surroundings of a sender.

15. The information processing apparatus according to claim 2, wherein the control unit acquires feedback of the user on the presented word-of-mouth information, and associates as evaluation information for the word-of-mouth information.

16. The information processing apparatus according to claim 2, wherein the control unit registers, as word-of-mouth information, collected speech voice of a user.

17. The information processing apparatus according to claim 16, wherein the control unit complements the speech voice in accordance with a user context, and then registers as the word-of-mouth information.

18. The information processing apparatus according to claim 1, wherein the information processing apparatus comprises a neck band speaker.

19. An information processing method comprising:
by a processor,
control presenting to a user of an information processing apparatus by voice, information that has been transmitted from another user of another information processing apparatus in surroundings of the user, wherein
control comprises controlling an output unit to emphasize and present, by voice, specific information among the information which has been transmitted from the another user in surroundings of the user, in accordance with a situation of the user, wherein the situation of the user comprises one or more of a fatigue degree of the user, a degree of happiness of the user, a degree of excitement of the user, whether the user is in heavy traffic, or whether the user is being crowded.

20. A non-transitory computer-readable medium having stored thereon a computer-readable program for causing a computer to
function as a control unit to control presenting to a user of an information processing apparatus by voice, information that has been transmitted from another user of another information processing apparatus in surroundings of the user, wherein
the control unit controls an output unit to emphasize and present, by voice, specific information among the information which has been transmitted from the another user in surroundings of the user, in accordance with a situation of the user, wherein the situation of the user comprises one or more of a fatigue degree of the user, a degree of happiness of the user, a degree of excitement of the user, whether the user is in heavy traffic, or whether the user is being crowded.

* * * * *